Nov. 16, 1943.                    C. H. LEHNUS                    2,334,422
                                PIPE PROTRACTOR
                              Filed Feb. 4, 1943
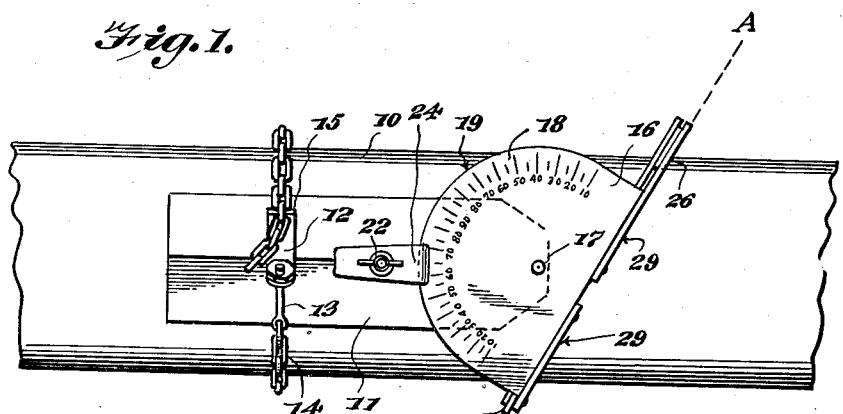
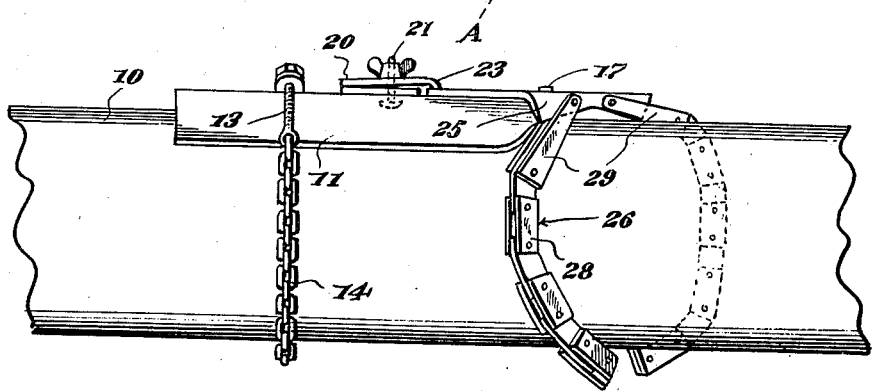
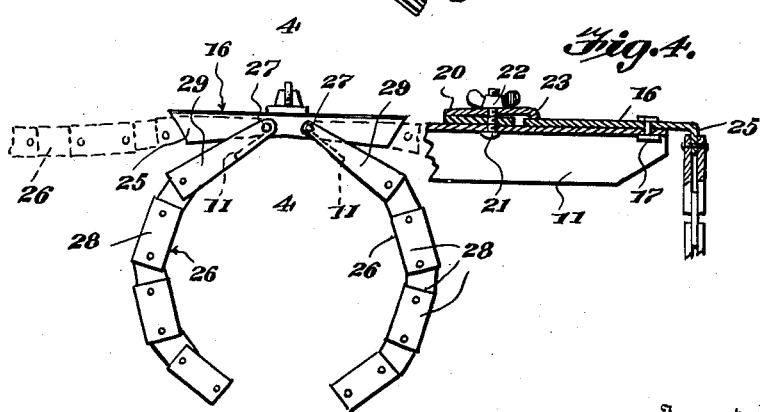
Inventor
CARL H. LEHNUS
By *[signature]*
Attorney Patented Nov. 16, 1943

2,334,422

UNITED STATES PATENT OFFICE 2,334,422

PIPE PROTRACTOR

Carl H. Lehnus, Lyons, Kans.

Application February 4, 1943, Serial No. 474,737

4 Claims. (Cl. 33—75)

This invention relates to pipe protractors, and has for one of its objects the production of a simple and efficient means for facilitating the accurate marking of angles on pipes and other round objects.

A further object of this invention is the production of a simple and efficient pipe protractor which is provided with an adjustable pipe-encircling element for snugly fitting around a pipe while the element is extended at an angle to the transverse axis of the pipe to facilitate the accurate marking of an angle cut to be made upon the pipe.

Other objects and advantages of the present invention will appear throughout the following specification and claims.

In the drawing:

Figure 1 is a top plan view of the protractor mounted upon a pipe;

Figure 2 is a side elevational view of the protractor;

Figure 3 is a front elevational view of the protractor;

Figure 4 is a fragmentary longitudinal sectional view taken on line 4—4 of Figure 3.

By referring to the drawing, it will be seen that 10 designates the pipe which is to be cut at an angle to the transverse and longitudinal axis thereof on the angle line A—A indicated in dotted lines in Figure 1. A supporting yoke 11 is provided which consists of a longitudinally extending angle member, and which yoke is adapted to fit upon the top face of the pipe and extend longitudinally thereof. An anchoring clip 12 is secured to the top face of the yoke 11, as shown in Figure 1, and this clip 12 carries at one end a bolt 13, which bolt 13 is connected to one end of an anchoring chain 14, which anchoring chain 14 is adapted to pass around the pipe 10 as shown in Figures 1 and 2. The opposite end of the clip 12 is provided with upwardly extending fingers 15, between which fingers is adapted to be fitted the free end of the anchoring chain 14 to adjustably hold the chain around the pipe 10, as shown in Figure 1.

A protractor plate 16 is pivotally secured, as at 17, to one end of the supporting yoke 11, and this protractor plate 16 is graduated, as at 18, with the degree of a circle near its periphery 19. A locking plate 20 is supported upon the supporting yoke 11, as shown in Figures 1, 2 and 4, by means of a threaded bolt 21 which bolt 21 is carried by the supporting yoke 11 and a thumb nut of a suitable type 22 is carried by the bolt 21 and engages the locking plate 20 for firmly holding the locking plate in engagement with the protractor plate 16, as shown in Figure 4. The locking plate 20 is preferably provided with a downwardly turned forward end 23 which overhangs the protractor plate 16 near its periphery 19 to facilitate the locking of the protractor plate 16 in a set selected and adjusted position when the thumb nut 22 is tightened. A central registering mark 24 is formed upon the top face of the locking plate 20, as shown in Figure 1, to facilitate the registration of the scale 18 in a selected position with respect to the registering mark 24.

The protractor plate 16 is provided with a downwardly turned flange 25 at its outer end, which flange is adapted to overhang the top of the pipe 10, and an adjustable pipe-encircling element in the nature of a pair of link jaws 26 is carried by the flange 25. Each link jaw 26 is pivotally secured, as at 27, to the flange 25, and each link jaw is formed of a plurality of pivotally connected links 28 which are pivotally secured to the pivoted connecting arms 29, which arms 29 are in turn pivotally connected to the pivots 27 carried by the flange 25.

From the foregoing description it will be seen that the supporting yoke 11 is first placed upon the top of the pipe and the chain 14 is passed around the pipe 10, and is secured in an adjusted position to the clip 12, thereby holding the yoke 11 firmly upon the pipe 10 and longitudinally thereof. The angle nature of the yoke, which is substantially V-shaped, will cause the yoke to straddle the pipe 10 longitudinally thereof, and thereby resist shifting movement upon the pipe. The protractor plate 16 is then set at the desired angle (by way of illustration note Figures 1 and 2), and the adjustable encircling element embodying the link jaws 26 will be placed snugly around the pipe, in this manner definitely defining a non-yielding guide following the contour of the surface of the pipe which will facilitate the marking of the pipe at the desired angle and in this way permitting the pipe to be properly cut to provide a snug joint with an adjoining pipe either for welding or for connection in some other conventional manner.

It is important to note that the connecting arms 29 are in the nature of links which straddle the flange 25 and that these links may be stretched outwardly to extend longitudinally of the flange 25 when desired, for the purpose of permitting the instrument to lie flat for packing or the like. Also it should be noted that the link jaws 26 may be adjusted to various sizes of pipes, depending upon the length of the jaws 26. It should be noted that it is highly important that some definite rigid guide is essential when marking angles upon a circular face, such as the contour of a pipe in order that a proper cut may be obtained to permit two pipes to be joined together at an angle particularly when welding. Consequently, by means of the linked jaws 26, I have provided such a means which is not only flexible but is at the same time sufficiently rigid to permit of an efficient marking.

Certain detail changes may be employed without departing from the spirit of the invention, so long as such changes fall within the scope of the appended claims.

Having described the invention, what I claim is:

1. A protractor of the class described comprising a support adapted to extend longitudinally of and lie upon a pipe, flexible means for anchoring the support in position, a protractor plate pivotally secured to said support, an adjustable encircling element suspended upon the protractor plate and adapted to snugly fit against the contour of a circular article to be marked, said encircling element comprising a pair of pivoted jaws, each jaw comprising a plurality of links, which links are adjustable relative to each other and the jaws being adjustable relative to each other.

2. A protractor of the class described comprising a support adapted to extend longitudinally of and lie upon a pipe, flexible means for anchoring the support in position, a protractor plate pivotally secured to said support, an adjustable encircling element suspended upon the protractor plate and adapted to snugly fit against the contour of a circular article to be marked, said encircling element comprising a pair of pivoted jaws, each jaw comprising a plurality of links which links are adjustable relative to each other and the jaws being adjustable relative to each other, and a locking plate carried by the support and engaging the protractor plate for locking the protractor plate at a set angle with respect to the support.

3. A protractor of the class described comprising a support adapted to extend longitudinally of and lie upon a pipe, flexible means for anchoring the support in position, a protractor plate pivotally secured to said support, an adjustable encircling element suspended upon the protractor plate and adapted to snugly fit against the contour of a circular article to be marked, said encircling element comprising a pair of pivoted jaws, each jaw comprising a plurality of links, which links are adjustable relative to each other and the jaws being adjustable relative to each other, a locking plate carried by the support and engaging the protractor plate for locking the protractor plate at a set angle with respect to the support, and a graduated scale carried by the protractor plate and adapted to register with the locking plate.

4. A pipe protractor of the class described comprising a support, a protractor plate pivotally secured on said support and adapted to be adjusted at an angle to the longitudinal axis of said support, said protractor plate having a depending flange, and a flexible pipe-encircling element pivotally hung upon said flange and adjustable to snugly fit the contour of a pipe, said encircling element comprising a pair of oppositely arranged jaws, each jaw comprising a plurality of links, the links of each jaw being adjustable relative to each other and the jaws being adjustable relative to each other.

CARL H. LEHNUS.